United States Patent
Kishida et al.

(10) Patent No.: US 8,950,455 B2
(45) Date of Patent: Feb. 10, 2015

(54) PNEUMATIC TIRE

(75) Inventors: Masahiro Kishida, Hyogo (JP); Ikuo Atake, Hyogo (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 1045 days.

(21) Appl. No.: 13/019,808

(22) Filed: Feb. 2, 2011

(65) Prior Publication Data
US 2011/0209806 A1 Sep. 1, 2011

(30) Foreign Application Priority Data
Mar. 1, 2010 (JP) .................................. 2010-044412

(51) Int. Cl.
*B60C 11/11* (2006.01)
*B60C 11/12* (2006.01)

(52) U.S. Cl.
CPC ............. B60C 11/11 (2013.01); B60C 11/1236 (2013.04); B60C 11/12 (2013.01); *B60C 2011/1295* (2013.04); *B60C 2011/1254* (2013.04); *B60C 2011/0358* (2013.04); *B60C 2200/06* (2013.04); *B60C 2011/1209* (2013.04); *B60C 2011/1338* (2013.04); *B60C 2011/0372* (2013.04); *Y10S 152/03* (2013.01)
USPC ................................ 152/209.18; 152/DIG. 3

(58) Field of Classification Search
CPC B60C 11/12; B60C 11/1236; B60C 11/0306; B60C 2011/0358; B60C 2011/1254; B60C 2011/129; B60C 2011/1295
USPC ................... 152/209.18, 209.25, 902, DIG. 3
See application file for complete search history.

(56) References Cited

U.S. PATENT DOCUMENTS 4,299,264 A * 11/1981 Williams .................. 152/209.18
6,578,612 B1 * 6/2003 Matsumura ................ 152/209.2

FOREIGN PATENT DOCUMENTS

| EP | 1048488 A2 | | 11/2000 |
|---|---|---|---|
| JP | 02-241804 | * | 9/1990 |
| JP | 03-050503 U | * | 5/1991 |
| JP | 07-101210 | * | 4/1995 |
| JP | 07-205617 | * | 5/1995 |
| JP | 2000-309207 A | | 11/2000 |
| JP | 2004-058838 | * | 2/2004 |
| JP | 2008-195095 | * | 8/2008 |

OTHER PUBLICATIONS

English machine translation of JP2004-058838, dated Feb. 2004.*
English machine translation of JP03-050503U, dated May 1991.*
English machine translation of JP2008-195095, dated Aug. 2008.*

* cited by examiner

*Primary Examiner* — Justin Fischer
*Assistant Examiner* — Robert Dye
(74) *Attorney, Agent, or Firm* — Birch, Stewart, Kolasch & Birch, LLP

(57) ABSTRACT

A pneumatic tire comprises a tread portion provided with a plurality of blocks, each of the block having a block wall surface facing a transverse groove inclined at an angle (theta) of from 5 to 40 degrees with respect to the tire axial-direction so as to define an acute-angled corner and an obtuse-angled corner on the block. The block wall surface between the acute-angled corner and the obtuse-angled corner is provided with at least two slits having a width of from 0.3 to 2.0 mm. A distance P2 measured from the acute-angled corner to one of the at least two slits which is nearest to the acute-angled corner is more than a distance P1 measured from said obtuse-angled corner to one of said at least two slits which is nearest to the obtuse-angled corner; each distance is measured along the radially outer edge of the block wall surface to the widthwise center of the slit.

10 Claims, 5 Drawing Sheets

PNEUMATIC TIRE

BACKGROUND OF THE INVENTION

The present invention relates to a pneumatic tire provided with a block pattern comprising blocks formed by circumferential grooves and transverse grooves, in particular, to a pneumatic tire capable of reducing pattern noise.

In a tire comprising a block pattern provided with a plurality of blocks on a tread surface wherein circumferential grooves extend in the circumferential direction of the tire and transverse grooves extend in the intersectional direction with the circumferential grooves, there is a problem that a block end of first ground contacting side taps on a road surface at a time of ground contacting and makes an impact noise. And, a vibration at the time of the impact causes exciting the air in the circumferential groove and generates columnar resonance.

To solve the problem, soft rubber has been used for the blocks to reduce the impact at the time of the block end taps a road surface so as to reduce the impact noise. Unfortunately, when the block rubber is too soft, the block deforms highly at a time of ground contacting, and compression and opening of the transverse grooves make loud air-pumping noise. This may cause more pattern noise by contraries, and there is fear of generating uneven wear. The pattern noise is defined here as entire noise arising from the tread pattern and comprising the above-mentioned impact noise, columnar resonance, air-pumping noise and the like, for example. It is therefore difficult to reduce sufficiently the pattern noise because rubber tenderization has its limit.

It view of such circumstances, to reduce the impact noise, Japanese Laid-open Patent Publication No. 2000-309207 discloses a tire comprising a block (a) provided with a large number of concave-or-convex non-flat portions (b) on a radially outer edge (ae) where a block wall surface (as) facing to a transverse groove and a tread surface (ts) meet. According to the Japanese Patent Publication No. 2000-309207, the above-mentioned non-flat portion (b) is dimple-like and flute-like. Disadvantageously, although having an effect on the reduction of the impact noise, the block has not been expected to have an effect on the reduction of the columnar resonance in the circumferential grooves.

Therefore, it's an object of the present invention to provide a pneumatic tire capable of removing pattern noise by reducing impact noise and columnar resonance while inhibiting air-pumping noise.

SUMMARY OF THE INVENTION

According to the present invention, a pneumatic tire comprises a tread portion provided with a plurality of blocks, and each of the blocks has a block wall surface facing a transverse groove inclined at an angle (theta) of from 5 to 40 degrees with respect to the tire axial-direction so as to define an acute-angled corner and an obtuse-angled corner on the block, wherein the block wall surface between the acute-angled corner and the obtuse-angled corner is provided with at least two slits having a width of from 0.3 to 2.0 mm
so that
a distance P2 measured from the acute-angled corner to one of the at least two slits which is nearest to the acute-angled corner,
is more than
a distance P1 measured from the obtuse-angled corner to one of the at least two slits which is nearest to the obtuse-angled corner, wherein the distance P1, P2 is measured along the radially outer edge of the block wall surface to the widthwise center of the slit concerned.

The blocks can be arranged in a plurality of circumferential rows divided by a plurality of circumferential grooves, and the circumferential rows may include a center row disposed on the tire equator.

Preferably, the at least two slits each have a circumferential length L of from 2.0 to 6.0 mm.

Preferably, the at least two slits are disposed at an interval or intervals P in a range of from 0.1 to 0.4 times a length W of the above-mentioned radially outer edge of the block wall surface, wherein the interval P is measured along the radially outer edge, between the widthwise centers of the adjacent slits, and the length W is measured along the radially outer edge.

The interval P is preferably not less than the distance P1 on the obtuse-angled corner side but less than the distance P2 on the acute-angled corner side.

Therefore, in the present invention, the transverse grooves are inclined at a comparatively large angle (in a range of from 5 to 40 degrees) with respect to the axial direction of the tire. This makes it possible for the block to contact gradually form the acute-angled corner and to reduce the impact. And, there are at least two slits on the block wall surface facing the transverse groove; therefore, rigidity of the block end can be moderately reduced. Combining with the impact reduction owing to the above-mentioned inclination of the transverse groove, the impact noise is accomplished suppressing.

Meanwhile, when softening the block rubber, the block deforms at the time of the ground contacting, and volume of the transverse grooves changes. This possibly brings a deterioration of the air-pumping noise. However, the slit according to the present invention works as an exhaust air stream, and the compressed air in the transverse grooves can be exhausted, thereby suppressing the air-pumping noise.

Owing to the inclination of the transverse grooves, the block is unfortunately provided with acute-angled corners and obtuse-angled corners. However, a distance P2 measured from the acute-angled corner to one of the at least two slits which is nearest to the acute-angled corner is more than a distance P1 measured from the obtuse-angled corner to one of the at least two slits which is nearest to the obtuse-angled corner. Therefore, a movement of the acute-angled corner having a low rigidity, or a vibration of the acute-angled corner can be suppressed at the time of impact, thereby suppressing a generation of the columnar resonance in the circumferential grooves.

Since the block contact the ground from a side of the acute-angled corner, the air pressure in the transverse groove is higher on a side of the obtuse-angled.

In the present invention, the relationship between the distances P1 and P2 is:

$$P1 < P2.$$

The slit on the obtuse-angled-side is formed in closing to the obtuse-angled corner. The obtuse-angled corner gets a high air pressure, so that the compressed air in the transverse groove can be effectively discharged. Moreover, the rigidity of the obtuse-angled corner reduces, and energy decreases, so that the uneven wear can be suppressed in the obtuse-angled corner.

DESCRIPTION OF THE PREFERRED EMBODIMENTS

Embodiments of the present invention will now be described in detail in conjunction with the accompanying drawings.

Figure 1:
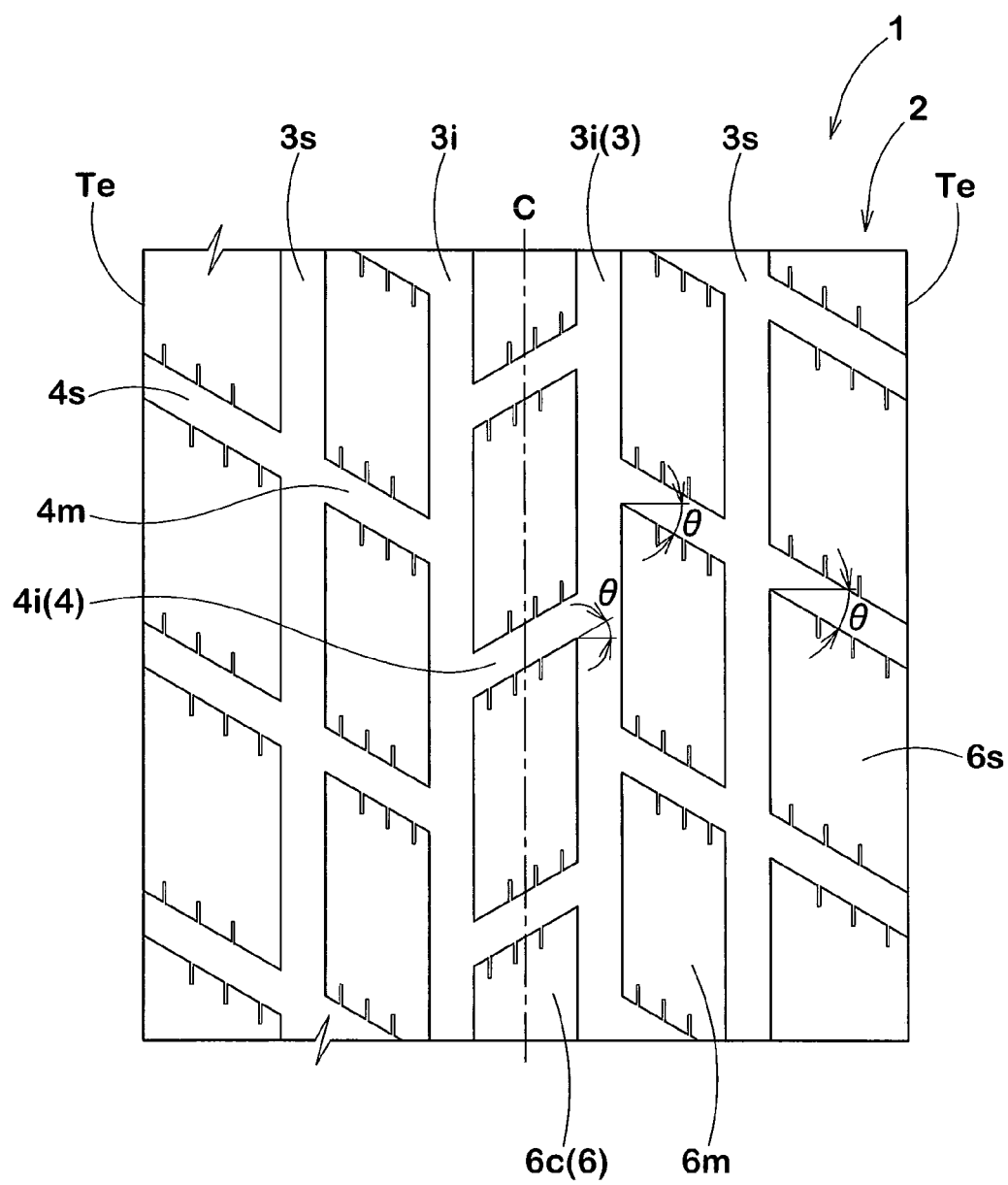
FIG. 1 is a development of a tread pattern of a pneumatic tire according to the invention.

FIG. 1 is a development of a tread pattern of a heavy-duty radial tire according to the invention. As shown in FIG. 1, the pneumatic tire 1 of the present embodiment is provided on a tread surface 2 with circumferential grooves 3 extending in the tire circumferential direction and transverse grooves 4 extending in the intersectional direction with the circumferential grooves 3, thereby forming a plurality of blocks 6 on the tread surface 2.

The circumferential groove 3 comprises, in the present embodiment, axially-inner longitudinal grooves 3i disposed in both sides of the tire equator c and axially-outer longitudinal grooves 3s disposed in the axially outside of the axially-inner longitudinal grooves 3i.

The transverse groove 4 comprises, in the present embodiment, axially-inner transverse grooves 4i positioned between the axially-inner longitudinal grooves 3i, axially-intermediate transverse grooves 4m positioned between each of the axially-inner longitudinal grooves 3i and each of the axially-outer longitudinal grooves 3s, and axially-outer transverse groove 4s positioned between each of the axially-outer longitudinal grooves 3s and each of the tread edges Te.

Therefore, the tread surface 2a comprises a block pattern formed of: a raw of central blocks 6c surrounded by the circumferential grooves 3i and the transverse grooves 4i; rows of axially intermediate blocks 6m surrounded by the circumferential grooves 3i and 3s and the transverse grooves 4m; and rows of axially outer block 6s surrounded by the circumferential grooves 3s, the tread edge Te, and the transverse grooves 4s.

In the pneumatic tire 1, it will be obvious that various changes may be made without limitation to the block pattern. At least one of the rows of blocks 6 may be replaced by a rib-block pattern which extends continuously in the tire circumferential direction, for example. A groove width and a groove depth of the above-mentioned circumferential groove 3 and the transverse groove 4 are also not especially limited, and the groove width and groove depth in a conventional pneumatic tire can be adopted arbitrarily.

Figure 2:
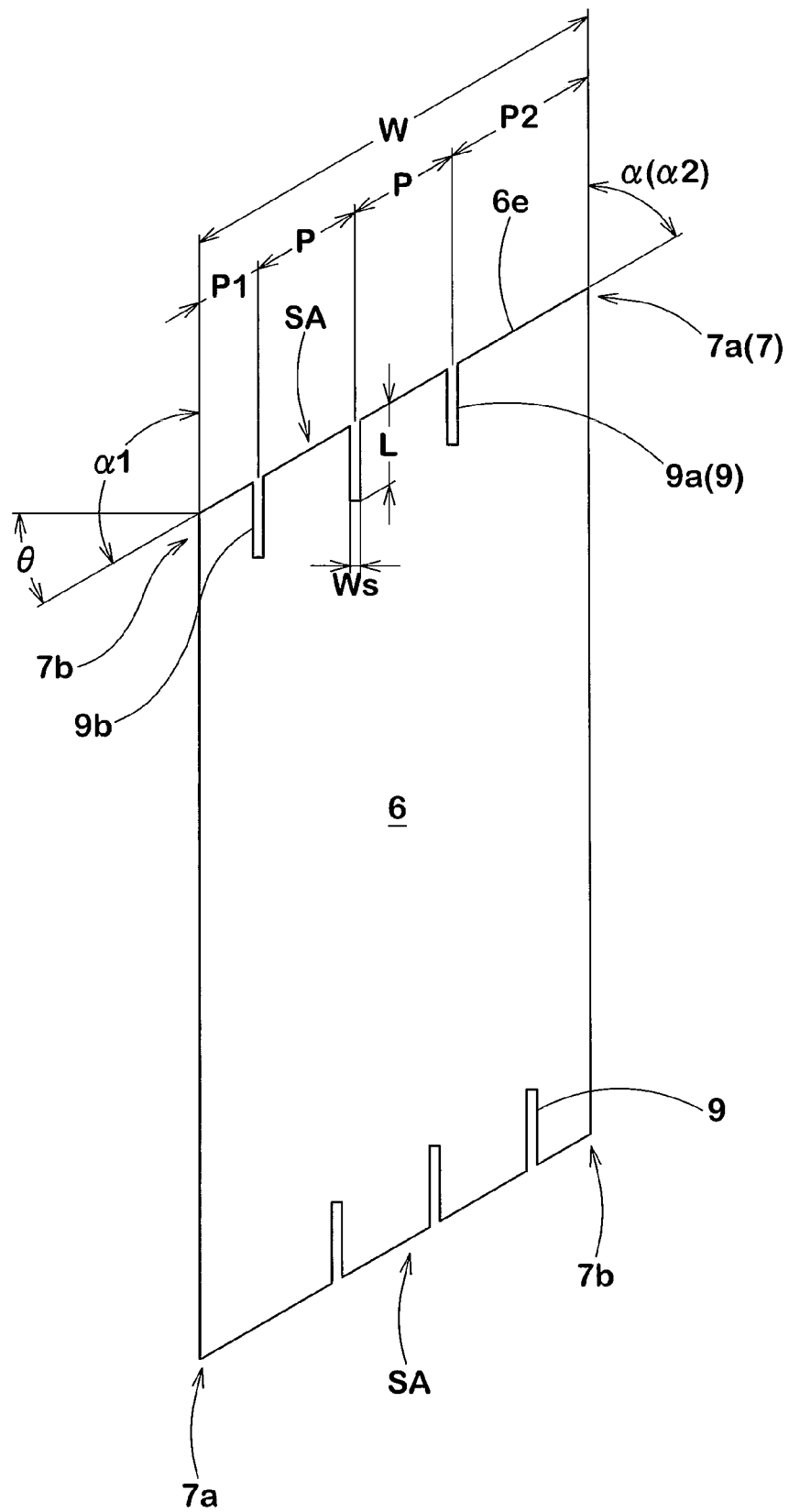
FIG. 2 is an enlarged plain view of a block.

Each of the above-mentioned transverse grooves 4 is inclined at an angle (theta) from of 5 to 40 degrees with respect to the tire axial-direction. As shown in FIG. 2, the transverse groove 4 is formed as inclined grooves. Therefore, each of the above-mentioned blocks 6 is provided with block corners 7 formed by intersecting the above-mentioned transverse groove 4 and the circumferential groove 3. The block corners 7 comprise acute-angled corners 7a which corner angle (alpha) takes the form of an acute angle and an obtuse-angled corners 7b which corner angle (alpha) takes the form of an obtuse angle between the transverse groove 4 and the circumferential groove 3.

Moreover, the above-mentioned block 6 is provided on the block wall surface SA facing the above-mentioned transverse groove 4 with at least two slits 9 (three slits 9 in the present embodiment) extending in the circumferential direction.

Figure 3:
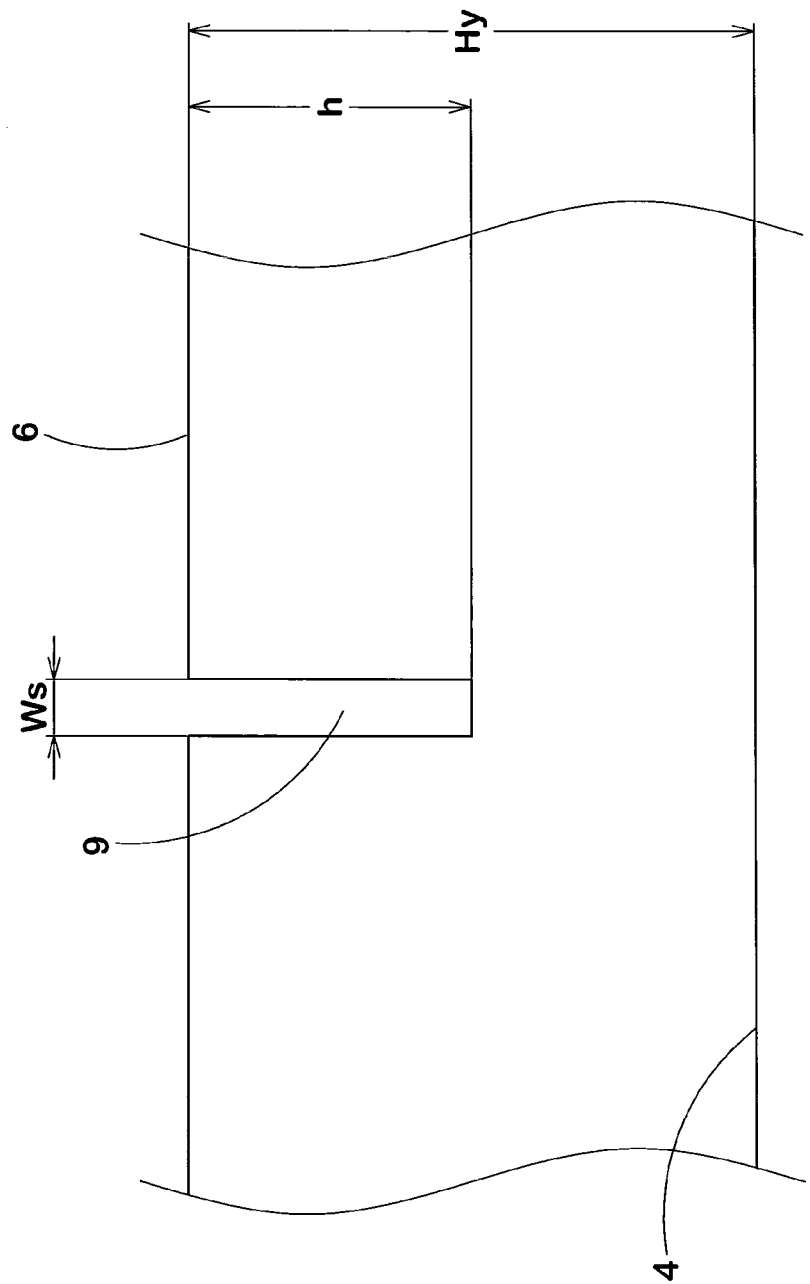
FIG. 3 is a cross-sectional view of the block in FIG. 2.
Figure 4A:
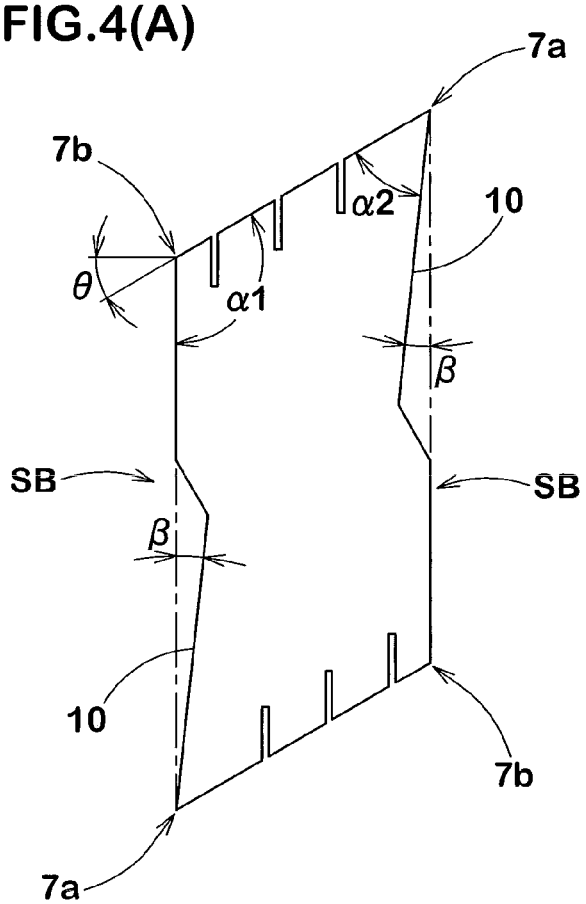
FIGS. 4(A), 4(B), 4(c), and 4(D) are plain views of the block showing other embodiments.
Figure 4C:
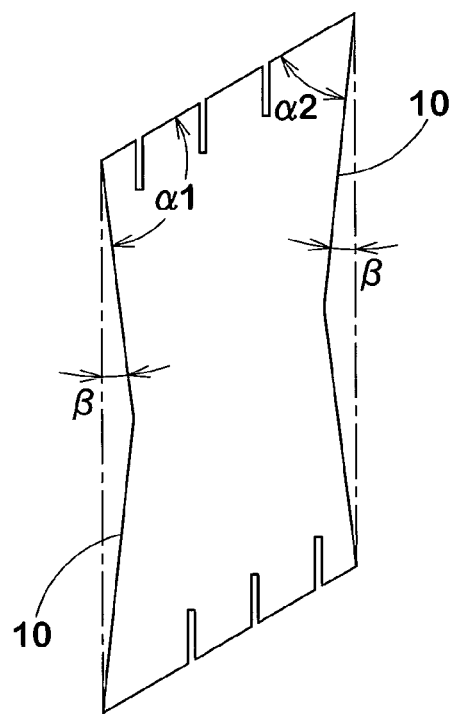
Figure 4B:
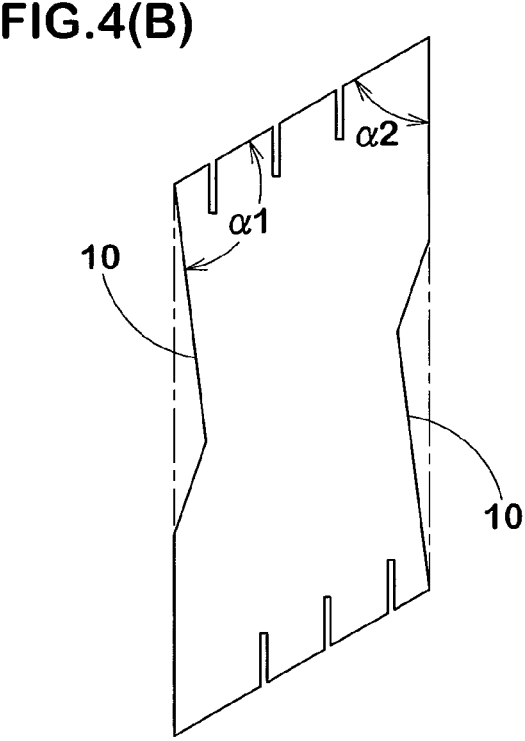
Figure 4D:
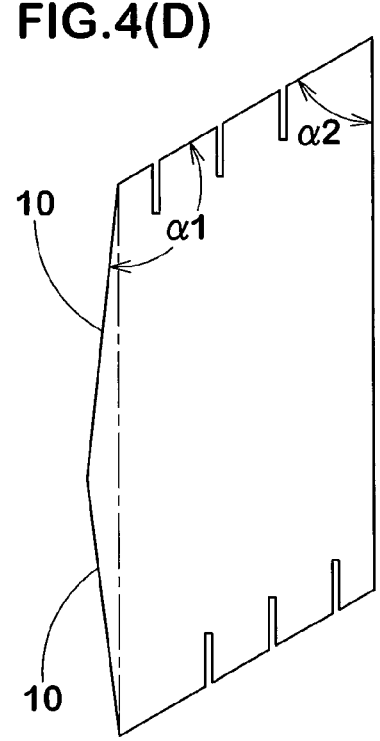
Figure 5:
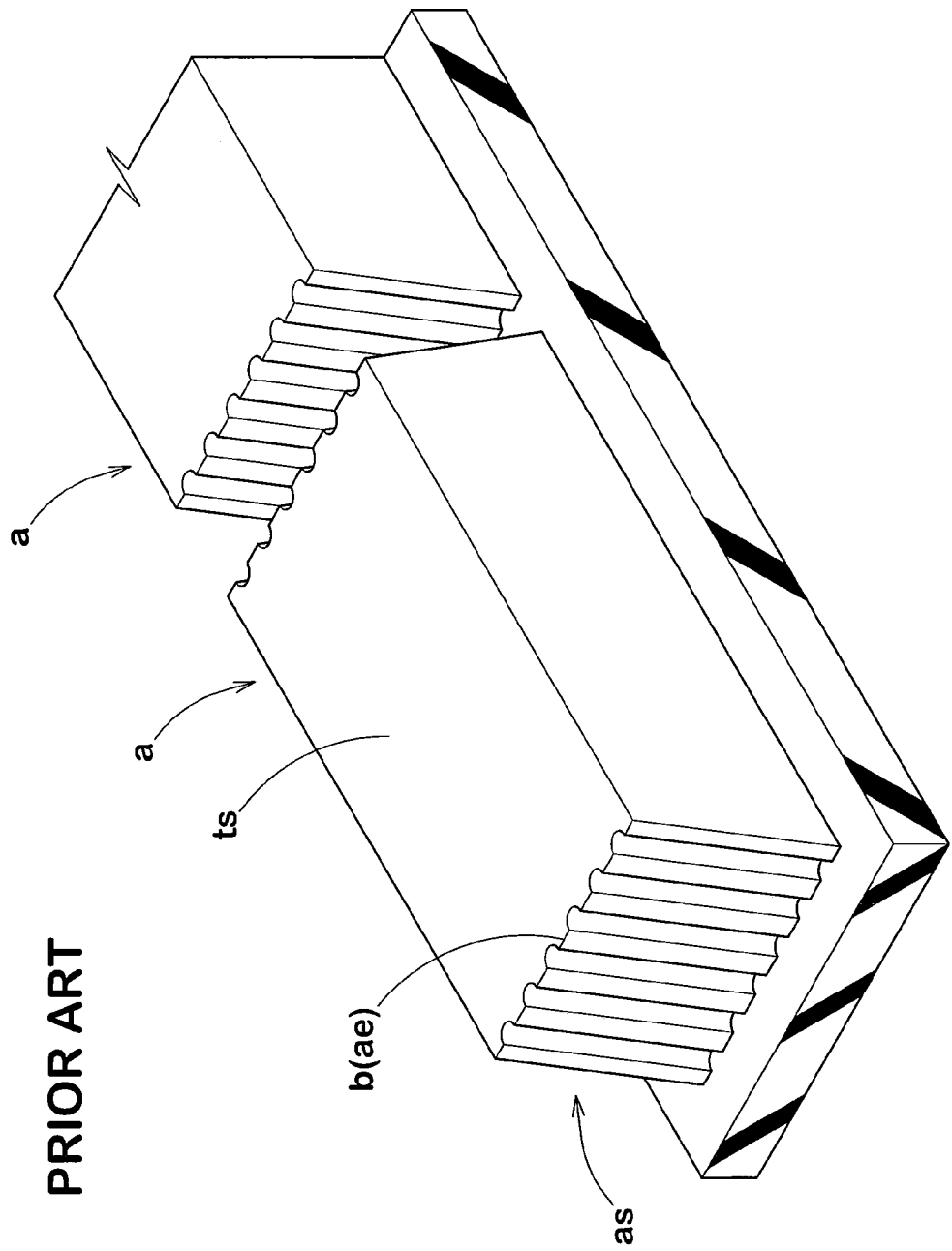
FIG. 5 is a perspective view of the block showing an example of conventional art.

Each of the slits 9 is a narrow groove having a width Ws of form 0.3 to 2.0 mm. One end of the slit 9 opens on the block wall surface SA and the other end terminates inside the block 6. A circumferential length L of the slit 9 is preferably in a range of from 2.0 to 6.0 mm, and a depth (h) of the slit 9 measured from the tread surface 2 is preferably in a range of from 0.3 to 1.0 times a groove depth Hy of the transverse groove 4 facing the slit 9 (shown in FIG. 3). The adjacent slits 9 are spaced at regular intervals each other in the present embodiment. Each interval P measured between the centers of the width of the adjacent slits 9 is in a range of from 0.1 to 0.4 times the length W of the radially outer edge 6e. And the radially outer edge 6e is defined as an edge where the block wall surface SA and the tread surface 2 meet.

In the above-mentioned block 6, one of the slits 9 nearest to the acute-angled corner 7a is defined as a slit 9a, and one of the slits 9 nearest to the obtuse-angled corner 7b is defined as a slit 9b. In this instance, a distance P2 measured from the acute-angled corner 7a to the slit 9a which is nearest to the acute-angled corner 7a is more than a distance P1 measured from said obtuse-angled corner 7b to the slit 9b which is nearest to the obtuse-angled corner 7b, and each distance is measured along the radially outer edge 6e of the block wall surface to the widthwise center of the slit.

In the tire 1 having such a tread pattern, the above-mentioned transverse groove 4 is inclined at an angle (theta) of from 5 to 40 degrees with respect to the tire axial-direction and, the block 6 can contact the ground surface gradually from the acute-angled corner 7a, thereby reducing shock at the time of impact. Moreover, there are at least two slits 9 on the block wall surface SA facing the above-mentioned transverse groove 4. These slits 9 can reasonably reduce the rigidity of the block end on the first ground contacting side. Combined with impact reduction owing to the inclination of the above-mentioned transverse groove 4, the slits can suppress the impact noise. Incidentally, when the above-mentioned angle (theta) is less than 5 degrees and when the number of slits 9 is one, an effect of impact reduction at the time of impact is insufficient. However, when the angle (theta) exceeds 40 degrees, wet grip performance and traction, which are intrinsic performance of the transverse grooves, are not sufficiently improved. Therefore, the angle (theta) is preferably not less than 25 degrees.

The above-mentioned slit 9 serves as an exhaust air stream to exhaust the air inside the transverse grooves 4. At the time of ground contacting, the slits 9 can help to exhaust the compressed air caused by the block deformation in the transverse grooves 4 and can reduce the air-pumping noise. When the width Ws of the slit 9 is more than 2.0 mm, a volume of the transverse groove 4 comprising the slits 9 becomes larger; this unfavorably causes an increase of the air-pumping noise. When the above-mentioned width Ws is less than 0.3 mm, a knife blade for forming slits becomes too thin to form the slit itself. Therefore, the lower limit of the width Ws is preferably not less than 0.6 mm; and the upper limit is preferably not more than 1.5 mm, more preferably not more than 1.0 mm.

When the length L of the slit 9 is less than 2.0 mm, the impact reduction at the time of impact becomes not very effective, and the slits 9 cannot sufficiently suppress the impact noise. However, when the length L exceeds 6.0 mm, a balance of the block rigidity becomes worse, and it may cause uneven wear. Therefore, the lower limit of the length L is preferably not less than 3.0 mm; and the upper limit is preferably not more than 5.0 mm.

When the slit depth (h) of the slit 9 is less than 0.3 times the transverse groove depth Hy, the impact reduction at the time of impact is not very effective, and the slit 9 wears in initial wear, thereby making the effect less produced early. However, the slit depth (h) exceeds 1.0 times the transversal groove depth Hy, the balance of the block rigidity becomes worse, thereby causing the uneven wear. Therefore, the lower limit of the slit depth (h) is preferably not less than 0.5 times the transverse groove depth Hy. And, not to wear only some of the slits 9 at the time of wearing, each of the slits 9 is preferably equivalent to each other in width Ws, length L, and slit depth (h).

When the interval P between the slits 9 is less than 0.1 times the radially outer edge 6e, the balance of the block rigidity becomes worse and is liable to cause uneven wear. However, when the interval P exceeds 0.4 times the length w, the impact reduction at the time of impact becomes not very effective, thereby suppressing the impact noise insufficiently. Therefore, the lower limit of the intervals P is preferably not less than 0.15 times, more preferably not less than 2.0 times the length W. And, the upper limit is preferably not more than 0.3 times.

Moreover, in the present invention, with respect to the acute-angled corner 7a and the obtuse-angled corner 7b formed by the above-mentioned transverse groove 4 which is inclined, the distance P2 of the slit 9 is more than the distance P1. Therefore, it can be reduced a movement of the acute-angled corner 7a having a low rigidity, or a vibration of the acute-angled corner 7a at the time of impact, and it makes possible to inhibit excitation and generation of the columnar resonance in the circumferential groove 3. At this time, to keep a good balance of block rigidities, the above-mentioned intervals P between the slits 9 are preferably not less than the distance P1 and less than the distance P2; that is, the preferable relation between the intervals is:

P1≤P≤P2.

To balance the above-mentioned block rigidity, a ratio (α2×P2)/(α1×P1) is preferably in a range of 1.0±0.2. The product (α2×P2) is a product of the above-mentioned corner angle α2 of the acute-angled corner 7a and the above-mentioned distance P2, and the product (α1×P1) is a product of the corner angle α1 of the obtuse-angled corner 7b and the above-mentioned distance P1.

Incidentally, in the present embodiment, the above-mentioned circumferential groove 3 is formed as a straight groove extending in the circumferential direction in a linear fashion. However, the circumferential groove 3 is not to be considered limited to the straight groove. As shown in FIGS. 4(A), 4(B), 4(c), and 4(D), the block wall surface SB facing the circumferential groove 3 may include inclined portions 10 inclined at an angle (beta) with respect to the circumferential direction, for example. Incidentally, when the above-mentioned inclined portion 10 extends from the acute-angled corner 7a and/or obtuse-angled corner 7b, the above-mentioned angle (beta) of the inclined portion 10 is smaller than the angle (theta) of the transverse groove 4. With this arrangement, the corner angle (alpha) of the acute-angled corner 7a takes the form of an acute angle, and the corner angle (alpha) of the obtuse-angled corner 7b takes the form of an obtuse angle. Furthermore, the block wall surface SB can be provided in a position spaced from the above-mentioned block corner 7 with cutouts.

Hereinbefore, especially preferred embodiments of the present invention were described, but it will be obvious that various changes may be made without limitation to what was shown in the drawings.

Comparison Tests

Heavy duty radial tires of size 275/80R22.5 were manufactured based on a tread pattern shown in FIG. 1 and a specification shown in Table 1 and were tested their noise and compared with each other. Each of the tires had the substantially same structure as follows except for the specification shown in Table 1:

Length W of radially outer edge of each block: 35 mm;
Width circumferential groove: 9 mm;
Depth of circumferential groove: 16 mm;
Width of transverse groove: 7 mm;
Depth Hy of transverse groove: 16 mm.

Tire Noise Test:

A single tire was rolled on a drum in accordance with the bench test specified in JAS0c606 in an anechoic room under the following condition:

Wheel rim: 7.50×22.5;
Inner pressure: 900 kPa;
Load: 23.7 kN;
speed: 40 km/h.

The noise sound level (O.A.) was measured with a microphone positioned one meter away from the tire center and 0.25 meters in height and compared with the differences from noise level of conventional Examples. The test results are shown in Table 1. A negative value minus sign means a dropping of the noise level.

TABLE 1

|  | Com. Example 1 | Com. Example 2 | Com. Example 3 | Example 1 | Example 2 | Example 3 | Example 4 | Example 5 | Example 6 | Example 7 | Example 8 |
|---|---|---|---|---|---|---|---|---|---|---|---|
| Number of slits | 0 | 3 | 3 | 3 | 3 | 3 | 3 | 3 | 3 | 3 | 3 |
| Slit depth (h) [mm] | — | 11.5 | 11.5 | 11.5 | 11.5 | 11.5 | 11.5 | 11.5 | 11.5 | 11.5 | 11.5 |
| Ratio h/Hy | — | 0.72 | 0.72 | 0.72 | 0.72 | 0.72 | 0.72 | 0.72 | 0.72 | 0.72 | 0.72 |
| Slit width Ws [mm] | — | 3.0 | 3.0 | 2.0 | 1.5 | 1.0 | 0.6 | 0.3 | 1.0 | 1.0 | 1.0 |
| Slit length L [mm] | — | 6.0 | 6.0 | 6.0 | 6.0 | 6.0 | 6.0 | 6.0 | 6.0 | 6.0 | 6.0 |
| Intervals P between slits [mm] | — | 8.5 | 8.5 | 8.5 | 8.5 | 8.5 | 8.5 | 8.5 | 8.5 | 8.5 | 8.5 |
| Ratio P/W | — | 0.24 | 0.24 | 0.24 | 0.24 | 0.24 | 0.24 | 0.24 | 0.24 | 0.24 | 0.24 |
| Inclination angle (theta) of transverse groove [degree] | 30 | 30 | 30 | 30 | 30 | 30 | 30 | 30 | 25 | 15 | 5 |
| Corner angle α1 of Obtuse-angled corner | 120 | 120 | 120 | 120 | 120 | 120 | 120 | 120 | 115 | 105 | 95 |
| Corner angle α2 of Acute-angled corner | 60 | 60 | 60 | 60 | 60 | 60 | 60 | 60 | 65 | 75 | 85 |
| Distance P1 [mm] | — | 9 | 6 | 6 | 6 | 6 | 6 | 6 | 6 | 6 | 6 |
| Distance P2 [mm] | — | 9 | 12 | 12 | 12 | 12 | 12 | 12 | 12 | 12 | 12 |
| Satisfaction of Relationship P1 ≤ P < P2 | No | No | Yes | Yes | Yes | Yes | Yes | Yes | Yes | Yes | Yes |

TABLE 1-continued

| Noise level [dB] | Standard | +0.4 | +0.2 | −0.2 | −0.3 | −0.4 | −0.4 | −0.5 | −0.4 | −0.3 | −0.2 |
|---|---|---|---|---|---|---|---|---|---|---|---|

| | Example 9 | Example 10 | Example 11 | Example 12 | Example 13 | Example 14 | Example 15 | Example 16 | Example 17 | Example 18 | Example 19 |
|---|---|---|---|---|---|---|---|---|---|---|---|
| Number of slits | 2 | 2 | 5 | 5 | 3 | 3 | 3 | 3 | 3 | 3 | 3 |
| Slit depth (h) [mm] | 11.5 | 11.5 | 11.5 | 11.5 | 6 | 4.8 | 3.5 | 11.5 | 11.5 | 11.5 | 11.5 |
| Ratio h/Hy | 0.72 | 0.72 | 0.72 | 0.72 | 0.375 | 0.30 | 0.22 | 0.72 | 0.72 | 0.72 | 0.72 |
| Slit width Ws [mm] | 1.0 | 1.0 | 1.0 | 1.0 | 1.0 | 1.0 | 1.0 | 1.0 | 1.0 | 1.0 | 1.0 |
| Slit length L [mm] | 6.0 | 6.0 | 6.0 | 6.0 | 6.0 | 6.0 | 6.0 | 2.0 | 3.0 | 5.0 | 7.0 |
| Intervals P between slits [mm] | 14 | 12.5 | 5.0 | 3.5 | 8.5 | 8.5 | 8.5 | 8.5 | 8.5 | 8.5 | 8.5 |
| Ratio P/W | 0.4 | 0.36 | 0.14 | 0.1 | 0.24 | 0.24 | 0.24 | 0.24 | 0.24 | 0.24 | 0.24 |
| Inclination angle (theta) of transverse groove [degree] | 30 | 30 | 30 | 30 | 30 | 30 | 30 | 30 | 30 | 30 | 30 |
| Corner angle α1 of Obtuse-angled corner | 120 | 120 | 120 | 120 | 120 | 120 | 120 | 120 | 120 | 120 | 120 |
| Corner angle α2 of Acute-angled corner | 60 | 60 | 60 | 60 | 60 | 60 | 60 | 60 | 60 | 60 | 60 |
| Distance P1 [mm] | 6 | 7.5 | 5 | 7 | 6 | 6 | 6 | 6 | 6 | 6 | 6 |
| Distance P2 [mm] | 15 | 15 | 10 | 14 | 12 | 12 | 12 | 12 | 12 | 12 | 12 |
| Satisfaction of Relationship P1 ≤ P < P2 | Yes | Yes | Yes | No | Yes | Yes | Yes | Yes | Yes | Yes | Yes |
| Noise level [dB] | −0.3 | −0.3 | −0.5 | −0.5 | −0.4 | −0.4 | −0.3 | −0.3 | −0.3 | −0.5 | −0.6 |

Throughout the test, it was confirmed that the tires in Examples were capable of comprehensively reducing pattern noise by inhibiting the impact noise and the columnar resonance while inhibiting air-pumping noise.

The invention claimed is:

1. A pneumatic tire comprising
a tread portion provided with a plurality of blocks,
each said block having two opposite block wall surfaces each facing a transverse groove inclined at an angle (theta) of from 5 to 40 degrees with respect to the tire axial-direction so as to define an acute-angled corner and an obtuse-angled corner on the block, wherein
each said block wall surface between the acute-angled corner and the obtuse-angled corner is provided with at least three slits having a width of from 0.3 to 2.0 mm so that a distance P2 measured from the acute-angled corner to one of said at least three slits which is nearest to the acute-angled corner, is more than a distance P1 measured from said obtuse-angled corner to one of said at least three slits which is nearest to the obtuse-angled corner, each distance being measured along the radially outer edge of the block wall surface to the widthwise center of the slit, and
said at least three slits are disposed at regular intervals P, wherein the interval P is measured along said radially outer edge between the widthwise centers of the slits.

2. The pneumatic tire according to claim 1, wherein said plurality of blocks are arranged in a plurality of circumferential rows divided by a plurality of circumferential grooves.

3. The pneumatic tire according to claim 2, wherein said plurality of circumferential rows include a center row disposed on the tire equator.

4. The pneumatic tire according to claim 3, wherein
the transverse grooves of the center row are inclined in one direction, and
the transverse grooves of the other rows are inclined in one direction which is different from that of the center row.

5. The pneumatic tire according to claim 4, wherein the transverse grooves of the rows other than the center row are inclined in a direction opposite from that of the center row.

6. The pneumatic tire according to claim 2, wherein the tread portion is provided along the tire equator with a circumferentially continuously extending rib.

7. The pneumatic tire according to claim 1, wherein said at least three slits each have a circumferential length L of from 2.0 to 6.0 mm.

8. The pneumatic tire according to claim 1, wherein said regular intervals P are in a range of from 0.1 to 0.4 times a length W of said radially outer edge of the block wall surface, wherein the length W is measured along said radially outer edge.

9. The pneumatic tire according to claim 8, wherein the intervals P are not less than said distance P1 on the obtuse-angled corner side and less than said distance P2 on the acute-angled corner side.

10. The pneumatic tire according to claim 1, wherein said angle (theta) is not less than 25 degrees.

* * * * *